United States Patent [19]

Udagawa et al.

[11] Patent Number: 5,209,504
[45] Date of Patent: May 11, 1993

[54] METAL LAMINATE GASKET

[75] Inventors: Tsunekazu Udagawa, Ichikawa; Susumu Inamura; Yoshio Yamada, both of Tokyo, all of Japan

[73] Assignee: Ishikawa Gasket Co., Ltd., Tokyo, Japan

[21] Appl. No.: 840,827

[22] Filed: Feb. 25, 1992

Related U.S. Application Data

[63] Continuation-in-part of Ser. No. 683,430, Apr. 10, 1991, which is a continuation-in-part of Ser. No. 193,215, May 11, 1988, Pat. No. 5,054,795, which is a continuation of Ser. No. 928,937, Nov. 10, 1986, abandoned.

[51] Int. Cl.$^5$ .............................................. F16J 15/08
[52] U.S. Cl. ................... 277/235 B; 277/234; 277/236
[58] Field of Search ............ 277/235 B, 236, 234

[56] References Cited

U.S. PATENT DOCUMENTS

| 4,272,085 | 6/1981 | Fujikawa et al. | 277/235 B |
| 4,714,260 | 12/1987 | Udagawa | 277/235 B |
| 4,739,999 | 4/1988 | Ishii et al. | 277/235 B |
| 4,834,399 | 5/1989 | Udagawa et al. | 277/235 B X |
| 4,836,562 | 6/1989 | Yoshino | 277/235 B |
| 5,054,795 | 10/1991 | Udagawa et al. | 277/235 B X |
| 5,058,908 | 10/1991 | Udagawa | 277/234 X |
| 5,092,613 | 3/1992 | Udagawa | 277/236 X |

FOREIGN PATENT DOCUMENTS

| 188955 | 12/1984 | Japan | 277/235 B |
| 261758 | 11/1987 | Japan | 277/235 B |
| 211660 | 8/1989 | Japan | 277/235 B |
| 2241025 | 8/1991 | United Kingdom | 277/235 B |

Primary Examiner—William A. Cuchlinski, Jr.
Assistant Examiner—James K. Folker
Attorney, Agent, or Firm—Kanesaka and Takeuchi

[57] ABSTRACT

A metal laminate gasket of the invention is installed in an internal combustion engine having at least one hole therein. The gasket comprises a first metal plate, and a second metal plate situated under the first metal plate. The first plate includes a first sealing device around a first hole to be sealed, and an inclined portion between the first sealing device and a base portion of the first plate. The upper surface of the base section is located in a level lower than the upper surface of the first sealing device. The second plate has a second hole larger than the first sealing device, and a second sealing device around the second hole. When the first and second plates are assembled, the second plate does not pile over the first sealing device. When the gasket is tightened, the second sealing device is at first compressed by tightening force and deforming force of the inclined portion to thereby equally tighten the second sealing device.

9 Claims, 2 Drawing Sheets

METAL LAMINATE GASKET

CROSS-REFERENCE TO RELATED APPLICATION

This is a continuation in part application of Ser. No. 683,430 filed on Apr. 10, 1991, which is a continuation in part application of Ser. No. 193,215 (now U.S. Pat. No. 5,054,795) filed on May 11, 1988, which, in turn, is a continuation application Ser. No. 928,937 filed on Nov. 10, 1986, abandoned.

BACKGROUND OF THE INVENTION AND RELATED ART STATEMENT

The present invention relates to a metal laminate gasket of a very thin type.

A conventional metal laminate gasket is constructed by laminating several plates, and is provided with a complicated sealing portion around a hole to be sealed. Consequently, it is difficult to manufacture a metal laminate gasket with light weight. Also, productivity of a metal laminate gasket is poor. As a result, a metal laminate gasket is more expensive than other gaskets.

In a small engine, a gasket must be light in weight and manufactured at a low cost. However, a conventional metal laminate gasket is heavy and expensive. Therefore, a conventional metal laminate gasket is not usually used for a small size engine.

In U.S. Pat. No. 4,834,399, a gasket formed of two plates was proposed, wherein an area around a hole is sealed by one or two sealing means formed on the plates. The gasket can securely seal around the hole as intended. However, the gasket is not suitable for sealing around a hole where a large force is applied, e.g. an engine with high compression ratio.

In the above patent, two sealing means may be formed around the hole at a distance away from each other. In this case, even if bolts are tightened equally, the two sealing means situated away from each other may not be equally tightened. Especially, in case high tightening force can not be applied to the engine parts, the sealing means may not be equally compressed. As a result, creep relaxation may occur at the sealing means.

Accordingly, one object of the present invention is to provide a metal laminate gasket for securely sealing around a hole, which is light in weight and simple in structure.

Another object of the invention is to provide a metal laminate gasket as stated above, wherein sealing means can be compressed equally by its own operation of the gasket.

A further object of the invention is to provide a metal laminate gasket as stated above, which can securely seal around a hole without concentrating sealing pressure at one portion.

A still further object of the invention is to provide a metal laminate gasket as stated above, which can be easily and economically manufactured.

Further objects and advantages of the invention will be apparent from the following description of the invention.

SUMMARY OF THE INVENTION

A metal laminate gasket of the invention is designed to be installed in an internal combustion engine having at least one hole therein. The gasket comprises a first metal plate and a second metal plate situated under the first metal plate.

The first plate includes a first hole corresponding to the hole of the engine, and first sealing means formed around the first hole to define and seal around the same. Further, the first plate includes a base section extending substantially throughout the entire area of the gasket, and an inclined portion situated between the first sealing means and the base section. The inclined portion has a height less than a thickness of the first sealing means. Namely, the upper surface of the base section is located in a level less than the upper surface of the first sealing means.

The second plate includes a second hole, and second sealing means formed around the second hole. The diameter of the second hole is larger than the diameter of the first sealing means to permit the second plate to pile over the base section without laying over the first sealing means.

The second sealing means has a height between a top of the second sealing means and a bottom of the second metal plate, which is greater than a thickness of the first metal plate. Therefore, when the gasket is tightened, the second sealing means is compressed by tightening force and deforming force of the inclined portion to equally tighten the second sealing means.

When the gasket is installed, the first sealing means and the second sealing means abut against engine parts, respectively. As the gasket is tightened, the inclined portion as well as the first and second sealing means are compressed. Since the inclined portion is pushed or expanded by the tightening force because the second sealing means is located near the inclined portion, counter force relative to the expansion of the inclined portion acts on the first and second sealing means to thereby further compress the first and second sealing means.

Especially, in case the first sealing means is formed of the solid portion, the counter force of the inclined portion is entirely applied to the second sealing means. Namely, the second sealing means is compressed by the tightening force and the counter force of the inclined portion. As a result, the second sealing means is strongly compressed.

Therefore, when the engine or gasket is tightened, the second sealing means of the gasket can be initially tightened strongly. Accordingly, the second sealing means can be equally compressed.

This structure is especially useful for an engine where bolts can not be tightened strongly, or there is a portion that the bolts can not be strongly tightened. The inclined portion provides compression force to the sealing means to be equally compressed.

When the upper surface of the base section is compressed and is located in the same level as the upper surface of the first sealing means, the counter force of the inclined portion terminates. The gasket is strongly tightened by the bolts to seal around the hole of the engine.

The first sealing means is formed of a lower section, an upper section, and curved portion between the upper and lower sections. The upper and lower sections may be closely placed one another to form a solid portion, or may have a space therebetween to provide resiliency thereat.

The second sealing means may include a projection and an inner edge around the second hole. The inner edge abuts against the inclined portion when the first and second metal plates are assembled. Therefore, when the gasket is tightened, the inner edge and inclined portion push against each other to provide high sealing pressure at the inclined portion and the projection.

In the present invention, the second sealing means is properly and equally compressed to seal around the engine hole.

DETAILED DESCRIPTION OF PREFERRED EMBODIMENTS

Figure 1:
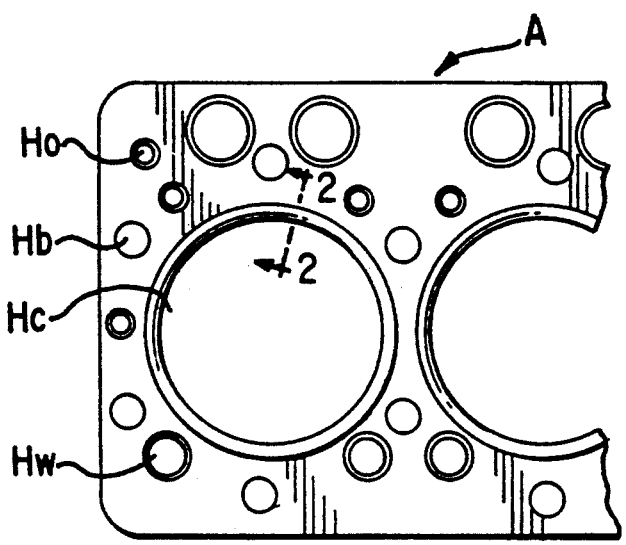
FIG. 1 is a plan view of a part of a first embodiment of a gasket of the invention.
Figure 2:
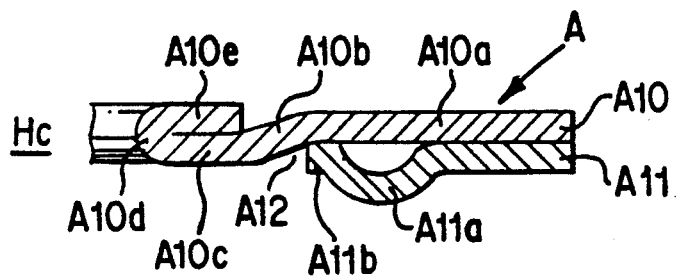
FIG. 2 is an enlarged section view taken along line 2—2 in FIG. 1.
Figure 3:
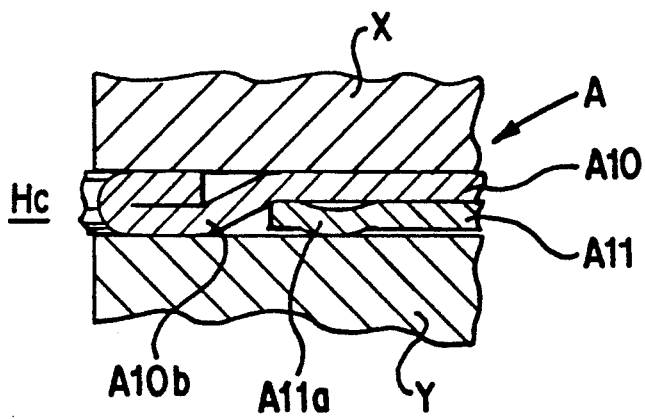
FIG. 3 is a section view showing that the gasket as shown in FIGS. 1 and 2 is compressed between a cylinder head and a cylinder block.

Referring to FIGS. 1-3, a first embodiment A of a metal laminate gasket of the invention is shown. The gasket A is a cylinder head gasket, and includes cylinder bores Hc, water holes Hw, oil holes Ho and bolt holes Hb, as in the conventional gasket.

The sealing mechanism of the invention is applied around the cylinder bore Hc, but the same sealing mechanisms may be formed around other holes, or for other gaskets, such as a manifold gasket.

As shown in FIG. 2, the gasket A comprises an upper plate A10, and a lower plate All situated under the upper plate A10. The upper plate A10 includes a base section A10a extending substantially throughout the entire area of the gasket A, and an inclined portion A10b extending inwardly and downwardly from the base section A10a. A lower inner portion A10c of the upper plate A10 extends further inwardly from the inclined portion A10b, and an upper inner portion A10e is turned at a curved portion A10d and is situated above the lower inner portion A10c.

A hole for the cylinder bore Hc is defined by the curved portion A10d. Also, the upper and lower inner portions A10e, A10c constitute a solid portion around the cylinder bore Hc.

The height of the inclined wall A10b, i.e. the distance from the lower surface of the lower inner portion A10c to the upper surface of the base section A10a, is lower than the thickness of the solid portion, i.e. the distance from the lower surface of the lower inner portion A10c to the upper surface of the upper inner portion A10e.

The lower plate All is situated under the base section A10a of the upper plate A10 and extends substantially throughout the entire area of the gasket A. The lower plate All includes a hole A12, and a bead A11a around the hole A12 to project in a direction away from the upper plate A10. The size of the hole A12 must be larger than the size of the lower inner portion A10c.

In the gasket A, the size of the hole A12 is larger than the size of the inclined wall A10b so that an edge A11b of the lower plate All is located adjacent to the inclined wall A10b. The thickness of the lower plate All is slightly thinner than that of the upper plate A10.

When the upper and lower plates A10, All are assembled, the upper surface of the upper inner portion A10e is located above a horizontal level of the upper surface of the base section A10a. The lower surface of the lower plate All is located lower than a horizontal level of the lower surface of the lower inner portion A10c. The bead A11a extends further downwardly from the lower surface of the lower plate All.

In the present invention, when the gasket A is tightened between a cylinder head X and a cylinder block Y, at first, the upper surface of the upper inner portion A10e contacts the cylinder head X while the top of the bead A11a contacts the cylinder block Y. As the gasket A is further tightened, the bead A11a is compressed.

When the gasket A is tightened, since the base section A10a does not contact the cylinder block X and the bead A11a is compressed, the inclined portion A10b together with a part of the base section A10a near the inclined portion A10b is also pushed upwardly. As a result, a counter force in the direction toward the cylinder block Y formed by the inclined portion A10b is formed. Therefore, the bead A11a is strongly compressed by the tightening force and counter force of the inclined portion A10b, so that the bead A11a is equally compressed.

As the gasket A is further tightened, the upper surface of the base section A10a abuts against the cylinder head X, by which the counter force of the inclined portion A10b disappears. The gasket A is strongly tightened as in the conventional gasket.

The solid portion non-resiliently seals around the cylinder bore Hc, while the bead A11a resiliently seal around the cylinder bore Hc. Since the solid portion is formed around the cylinder bore Hc, when the gasket A is tightened, tightening pressure is not concentrated at one portion and is equally spread on the solid portion. Therefore, the gasket can be tightened at high tightening pressure without deformation of the cylinder bore Hc.

As explained before, the lower plate All is thinner than the upper plate A10. Therefore, the solid portion, i.e. the upper and lower inner portions A10e, A10c, is thicker than the total thickness of the upper and lower plates A10, All. When the gasket A is tightened, therefore, the bead A11a is not completely compressed. As a result, creep relaxation of the bead A11a is prevented by the solid portion.

When the upper and lower plates A10, All are assembled, the edge A11b abuts against the inclined portion A10b. When the gasket A is tightened, the edge A11b tries to move toward the inclined portion A10b, but the movement of the edge A11b is blocked by the inclined portion A10b and the bead A11a is equally compressed by the counter force applied to the inclined portion A10b together with the tightening force. Therefore, the bead A11a is compressed strongly with equal pressure.

The gasket is sealed non-resiliently by the solid portion and resiliently by the bead. Since the bead is equally compressed, the gasket is especially useful for an engine where bolts can not be tightened strongly, or there is a portion that the bolts can not be strongly tightened.

Figure 4:
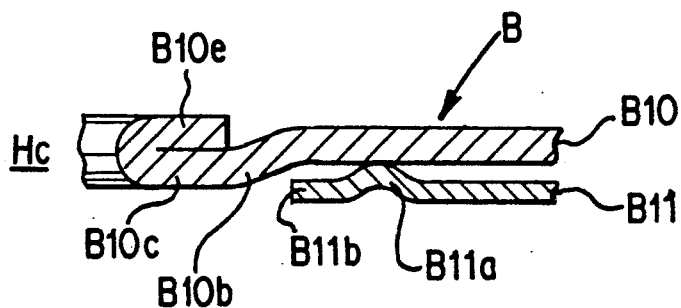
FIGS. 4–6 are section views, similar to FIG. 2, of second to fourth embodiments of the invention.

FIG. 4 shows a second embodiment B of the metal laminate gasket of the invention. The gasket B comprises an upper plate B10 with an inclined portion B10b and upper and lower inner portions B10e, B10c, and a lower plate B11 with a bead B11a, similar to the gasket A. In the gasket B, however, the lower plate B11 is arranged so that the bead B11a contacts the upper plate B10. Therefore, high surface pressure formed by the bead B11a is not directed to the cylinder block when tightened.

In the gasket B, although an edge B11b of the lower plate B11 does not contact the inclined portion B10b, the gasket B operates substantially similarly as in the gasket A.

Figure 5:
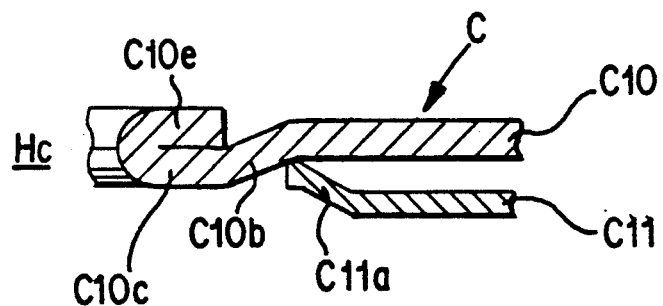

FIG. 5 shows a third embodiment C of the metal laminate gasket of the invention. The gasket C includes an upper plate C10 with an inclined portion C10b and upper and lower inner portions C10e, C10c, and a lower plate C11, similar to the gasket A. In the gasket C, however, the lower plate C11 is provided with an inclined portion C11a instead of a bead.

The inclined portion C11a is formed in case a regular bead can not be formed, such as there is not enough space for forming a bead in view of other members. When the gasket C is tightened, the inclined portion C11a deforms to seal around the cylinder bore Hc. The gasket C operates as in the gasket A.

Figure 6:
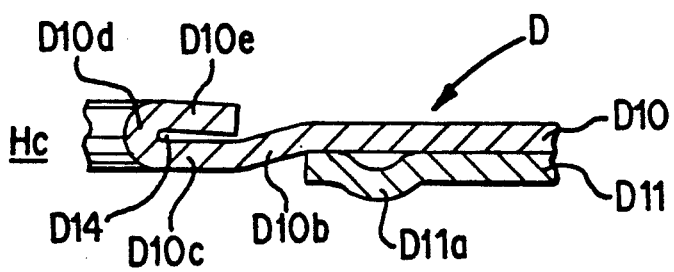

FIG. 6 shows a fourth embodiment D of a metal laminate gasket of the invention. The gasket D includes an upper plate D10 with an inclined portion D10b and upper and lower inner portions D10e, D10c, and a lower plate D11 with a bead D11a, similar to the gasket A.

In the gasket D, however, the upper inner portion D10e is connected to the lower inner portion D10c through a curved portion D10d such that a space D14 is formed between the upper and lower inner portions D10e, D10c.

When the gasket D is tightened, the space D14 is diminished so that the upper and lower inner portions D10e, D10c substantially form a solid portion thereat. Since the space D14 is not completely crashed when the gasket D is tightened, the curved portion D10d forms resiliency to seal around the cylinder bore.

In the present invention, when the gasket is tightened, the bead of the lower plate is compressed by the force applied to the inclined portion of the upper plate in addition to the tightening force of the gasket. Therefore, the bead can be equally compressed when the gasket is tightened.

While the invention has been explained with reference to the specific embodiments of the invention, the explanation is illustrative and the present invention is limited only by the appended claims.

What is claimed is:

1. A metal laminate gasket for an internal combustion engine having at least one hole therein comprising:
   a first metal plate including at least one first hole corresponding to the hole of the engine, first sealing means situated around the first hole to define and seal around the first hole, said first sealing means including a lower section and an upper section situated above the lower section and having an upper outer surface, a base section having an upper outer surface and extending substantially throughout an entire area of the gasket, and an inclined portion situated between the lower section of the first sealing means and the base section and having a height less than a thickness of the first sealing means so that the upper outer surface of the base section is located below the upper outer surface of the upper section of the first sealing means, and
   a second metal plate situated under the base section of the first plate, said second plate having at least one second hole, a diameter of the second hole being larger than an outer diameter of the first sealing means to permit the second plate to be compressed by the base section without laminating the first sealing means when the gasket is assembled, and second sealing means situated around the second hole and having a height between a top of the second sealing means and a bottom of the second metal plate greater than a thickness of the first metal plate so that when the first and second plates are assembled to contact with each other, a part of the second plate is located below a lower surface of the lower section of the first sealing means, and when the gasket is tightened, the inclined portion is initially expanded in a direction away from the second metal plate, and the second sealing means is compressed by tightening force and a counter force relative to expansion of the inclined portion to equally tighten the second sealing means throughout the entire area of the second sealing means.

2. A metal laminate gasket according to claim 1, wherein said first sealing means further includes a curved portion situated between the upper and lower sections and defining the first hole, said upper section being turned to be closely placed above the lower section to form a solid portion thereat.

3. A metal laminate gasket according to claim 2, wherein a thickness of the first plate is thicker than that of the second plate so that the solid portion is thicker than a total thickness of the gasket outside thereof to prevent creep relaxation of the second sealing means when the gasket is tightened.

4. A metal laminate gasket according to claim 1, wherein said second sealing means includes a projection formed in the second metal plate, said second metal plate having an inner edge around the second hole, said inner edge abutting against the inclined portion when the first and second metal plates are assembled together so that when the gasket is tightened, the inner edge and the inclined portion push against each other to provide high sealing pressure at the inclined portion and the projection.

5. A metal laminate gasket according to claim 4, wherein said projection is a bead formed around the second hole and projecting outwardly away from the first plate.

6. A metal laminate gasket according to claim 5, wherein said projection is an inclined wall.

7. A metal laminate gasket according to claim 1, wherein said first sealing means further includes a curved portion situated between the upper and lower sections and defining the first hole, and a space around the curved portion so that the first sealing means provides resiliency around the curved portion.

8. A metal laminate gasket according to claim 1, wherein at least a part of the second metal plate located at a side away from the first metal plate further projects outwardly from the lower section of the first sealing means when the first and second metal plates are assembled so that when the gasket is installed in the engine, the outer surface of the first sealing means contacts a part of the engine and said part of the second metal plate contacts the other part of the engine.

9. A metal laminate gasket for an internal combustion engine having at least one hole therein, consisting essentially of:
   a first metal plate including at least one first hole corresponding to the hole of the engine; first sealing means situated around the first hole to define and seal around the first hole, said first sealing means including a lower section with a lower outer surface, an upper section with an upper outer surface situated closely above the lower section, and a curved portion situated between the upper and lower sections and defining the first hole, said first sealing means forming a non-compressible solid portion; a base section having an upper outer surface and extending substantially throughout an entire area of the gasket; and an inclined portion situated between the lower section of the first sealing means and the base section and having a height less than a thickness of the first sealing means so that the upper outer surface of the base section is located below the upper outer surface of the upper section of the first sealing means, and a second metal plate situated under the base section of the first plate and having a thickness less than a thickness of the first plate, said second plate including at least one second hole, a diameter of the second hole being larger than an outer diameter of the lower section of the first sealing means to permit the second plate to laminate the base section of the first plate without overlapping the first sealing means when the gasket is assembled; and second sealing means situated around the second hole, said second sealing means being formed of a bead and having a height between an apex of the bead and a bottom of the second plate greater than the thickness of the first plate so that when the first and second plates are assembled to contact with each other, a part of the second plate is located below the lower surface of the lower section of the first sealing means, and when the gasket is tightened, the inclined portion is initially expanded in a direction away form the second plate, and the bead is compressed by tightening force of the gasket and a counter force relative to expansion of the inclined portion to easily and equally tighten the bead throughout the entire area thereof.

* * * * *